United States Patent [19]

Takemoto et al.

[11] Patent Number: 4,975,717
[45] Date of Patent: Dec. 4, 1990

[54] APPARATUS FOR RECORDING IMAGE

[75] Inventors: Hiroaki Takemoto; Yutaka Tamura, both of Kyoto; Kiyoshi Maeda, Hikone, all of Japan

[73] Assignee: Dainippon Screen Mfg. Co., Ltd., Japan

[21] Appl. No.: 395,812

[22] Filed: Aug. 18, 1989

[30] Foreign Application Priority Data

Aug. 22, 1988 [JP] Japan .................. 63-209298

[51] Int. Cl.$^5$ ............... G01D 15/14; G03B 27/14; B41J 2/44
[52] U.S. Cl. ..................... 346/108; 350/173
[58] Field of Search .............. 346/108, 160; 350/173

[56] References Cited

U.S. PATENT DOCUMENTS

| | | | |
|---|---|---|---|
| 4,502,757 | 3/1985 | Maeda | 350/173 |
| 4,617,578 | 10/1986 | Nezu | 346/108 |
| 4,688,883 | 8/1987 | Blaha . | |
| 4,758,848 | 7/1988 | Nakano | 346/108 |
| 4,762,417 | 8/1988 | Wu . | |
| 4,777,358 | 10/1988 | Nelson . | |
| 4,799,210 | 1/1989 | Wilson . | |
| 4,844,618 | 6/1989 | Hamar . | |

Primary Examiner—Bruce A. Reynolds
Assistant Examiner—Scott A. Rogers
Attorney, Agent, or Firm—Ostrolenk, Faber, Gerg & Soffen

[57] ABSTRACT

A light source (8) and beam splitter (24) are connected with each other through a single mode optical fiber (14) cable so that a laser beam (B1) emitted from the light source is transmitted to the beam splitter through the single mode optical fiber cable, to be divided into a plurality of laser beams (B4). The respective laser beams emitted from the beam splitter are modulated by an acoustic-optical modulator (30), and then focused onto a photosensitive film (F).

8 Claims, 4 Drawing Sheets

APPARATUS FOR RECORDING IMAGE

BACKGROUND OF THE INVENTION

1. Field of the Invention

The present invention relates to an apparatus for recording an image, and more particularly, it relates to an image recorder having an recording head and a light source which are separated from each other so that laser beams from the light source are guided to the recording head through an optical fiber cable.

2. Description of the Prior Art

In an image recorder, a light source is provided in the interior or exterior of a recording head on the recorder.

For example, Japanese Patent Laid-Open Gazette No. 14134/1983 discloses an image recorder having a light source exteriorly of a recording head. FIG. 1 illustrates a recording part of this image order. As shown in FIG. 1, a light source part 50 and a recording head 64 are separately provided and connected with each other through optical fiber cables 60.

The light source part 50 is comprises of a laser tube 52, an optical unit 54, for expanding a laser beam leaving the laser tube 52, in a direction (upper and lower direction in FIG. 1) perpendicular to an optical axis of the laser beam, an acoustic optical modulator system 56 comprising a plurality of optical modulators which are provided in correspondence to the laser beams of the optical unit 54 for independently turning the laser beam on-off in response to image signals corresponding to an image to be recorded, and condenser lenses 58 converging the respective laser beams from the acoustic optical modulator system 56 and introducing them into incident ends 62 of the optical fiber cables 60. Thus, the laser beams from the laser tube 52 are modulated in response to the image signals supplied to the light source part 50, and are thereafter guided to the recording head 64 through the plurality of optical fiber cables 60.

The recording head 64 comprises an image formation lens 68, so that the laser beams emerging from ends 66 of the optical fiber cables 60 are made to impinge onto a photosensitive material F which is wound on a rotating cylinder 2 through the image formation lens 68, respectively.

As understood from FIG. 1, the optical unit 54, the acoustic optical modulator system 56 and the condenser lenses 58 are provided in the optical paths for introducing the laser beams of outgoing from the laser tube 52 into the optical fiber cables 60, so that the optical path length l from the laser tube 52 to the incident ends of the optical fiber cables 60 is considerably long. Therefore, even if optical axes of the laser beams are only slightly changed due to changes in ambient temperature or vibration of the image recorder, the optical axes of the laser beams may be so displaced from those of the optical fiber cables 60 that the laser beams cannot be introduced into the optical fiber cables 60.

In order to overcome the problem, the optical fiber cables 60 have been generally constructed in the form of multimode optical fibers. This is because the core diameter of a multimode optical fiber cable is larger than that of a single mode fiber. That is, even if the optical axes of the laser beams are slightly displaced, the laser beams will nonetheless be coupled into the incident ends 62 of the optical fiber cables 60 since the optical fiber cables 60 have larger core diameters.

Multimode optical fiber cables 60 guide the laser beams mainly through internal irregular reflection within the fibers as is well known in the art. Thus, the laser beams of the optical fiber cables 60 have a speckled or spotted pattern, as shown in FIG. 2.

Therefore, when the optical fiber cables 60 are bent following movement of the recording head 64 during recording of an image on the photosensitive material F, the aforementioned spotted pattern will vary and cause fluctuations in the amounts of light of the respective laser beams incident upon the image formation lens 68, i.e., the exposure levels of the photosensitive material F will vary. Consequently, the diameters of the pixels recorded on the photosensitive material F will similarly vary which will deteriorate the picture quality.

According to the known art furthermore, the respective laser beams modulated by the acoustic optical modulator 56 are guided to the recording head 64 through the plurality of optical fiber cables 60 as described above, and hence a large number of elements are required for arranging the optical fiber cables, which increases the size of the apparatus, and complicates adjusting of the optical system etc.

SUMMARY OF THE INVENTION

The present invention is directed to an apparatus for recording an image on a recording surface. The apparatus comprises: a light source for generating a laser beam; a single mode optical fiber cable for transmitting the laser beam of the light source; first polarizing means provided on the output end side of the single mode optical fiber cable for converting the laser beam into a polarized laser beam having a prescribed polarization plane; dividing means for dividing the polarized laser beam; a first optical modulator for modulating the plurality of laser beams individually in response to image signals representing the image; and optical means for directing the laser beams modulated by the first optical modulator toward the recording surface.

Accordingly, an object of the present invention is to provide an image recorder which produces high picture quality.

Another object of the present invention is to provide a reduced size image recorder.

A further object of the present invention is to provide an image recorder whose optical system can be easily adjusted.

These and other objects, features, aspects and advantages of the present invention will become more apparent from the following detailed description of the present invention when taken in conjunction with the accompanying drawings.

DESCRIPTION OF THE PREFERRED EMBODIMENTS

A. First Embodiment

Figure 1:
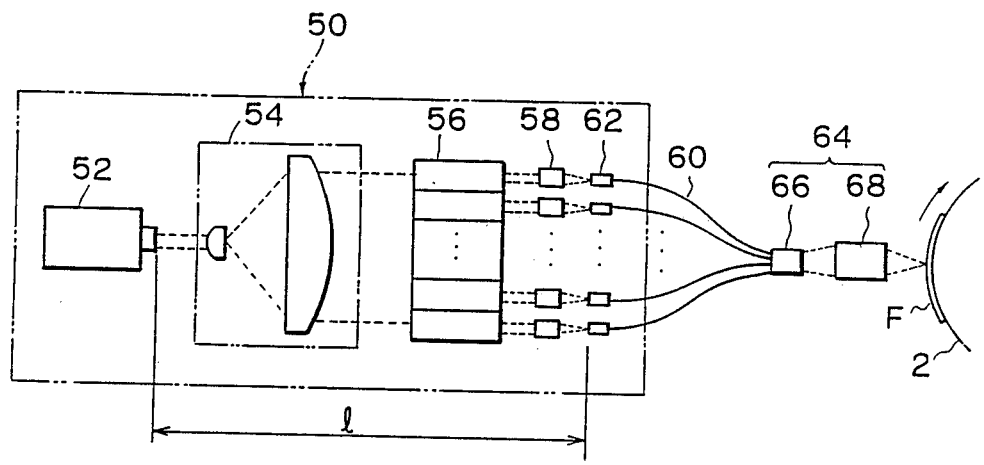
FIG. 1 illustrates a recording part of the conventional image recorder.
Figure 2:
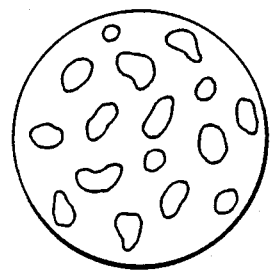
FIG. 2 illustrates a speckle pattern.
Figure 3:
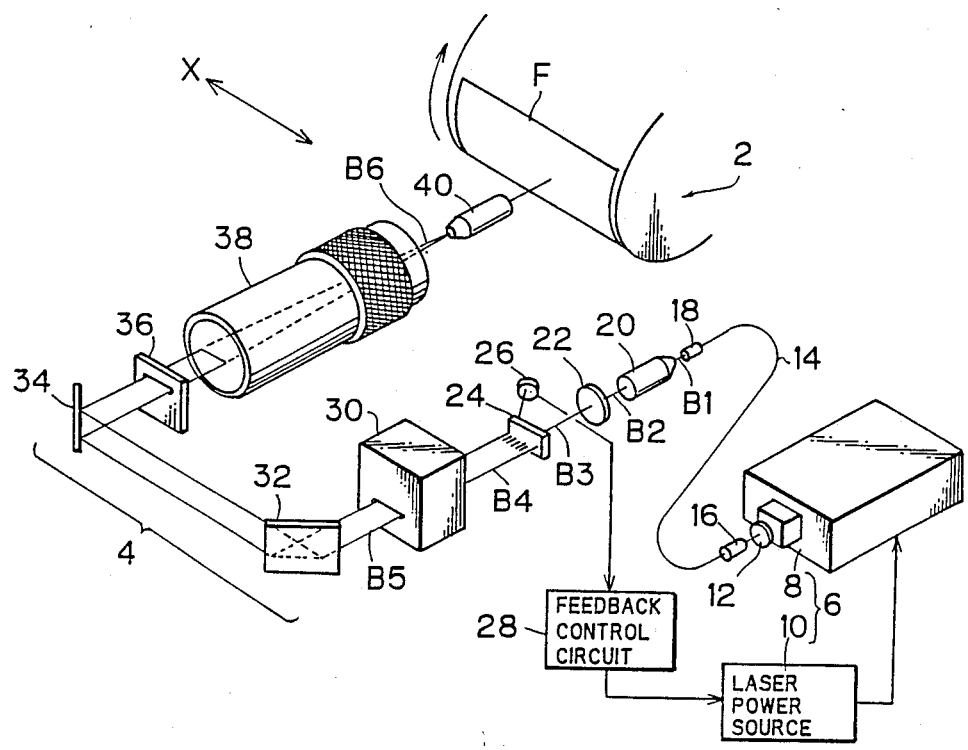
FIG. 3 is a perspective view of a recording part of an image recorder according to a first embodiment of the present invention.

FIG. 3 is a perspective view of a recording part of an image recorder according to a first embodiment of the present invention. The image recorder includes a light source 6 for generating a laser beam, a recording head 4 for dividing the laser beam into a plurality of laser beams and directing the laser beams toward a photosensitive material F to thereby record a portion of an image to be recorded and a driving unit (not shown) coupled to the recording head 4 for moving the same in the X-direction (see FIG. 3). As shown in FIG. 3, the light source 6 and the recording head 4 are optically coupled through a single mode optical fiber cable 14.

The light source 6 is formed by an Ar laser tube 8 for emitting a laser beam and a laser power source 10 which supplies tube current to the Ar laser tube 8, so that the laser beam is emitted from the light source 6 in response to the tube current supplied from the laser power source 10 to the Ar laser tube 8, to impinge upon an incident end 16 of the single mode optical fiber cable 14 through a condenser lens 12.

The term "single mode optical fiber cable" indicates an optical fiber cable having only one guided mode, the core diameter of the single mode optical fiber cable 14 being small as compared with that of a multimode optical fiber cable.

As understood from FIG. 3, the optical element provided between the light source 6 and the incident end 16 of the optical fiber cable 14 is comprised only of the condenser lens 12. Thus, the optical path length between the Ar laser tube 8 and the incident end 16 of the optical fiber cable 14 is short. Therefore, even if the optical axis of the laser beam emitted from the Ar laser tube 8 is varied due to vibration or the like, this optical axis will not be displaced outside a light receiving region of the incident end 16 of the optical fiber cable 14.

The outgoing end 18 of the optical fiber cable 14 is provided in correspondence to the recording head 4, so that the laser beam emitted from the light source 6 is guided to the recording head 4 through the optical fiber cable 14.

The recording head 4 is provided with a collimator lens 20, which is located so as to face the outgoing end 18 of the optical fiber cable 14. Therefore, a laser beam (non-parallel beam) B1 emitted from the outgoing end 18 is converted into a parallel laser beam B2 by the collimator lens 20, and thereafter impinges upon a beam dividing unit such as a beam splitter 24 through a polarizing unit such as a polarizing prism or a polarizing plate 22.

Figure 4:
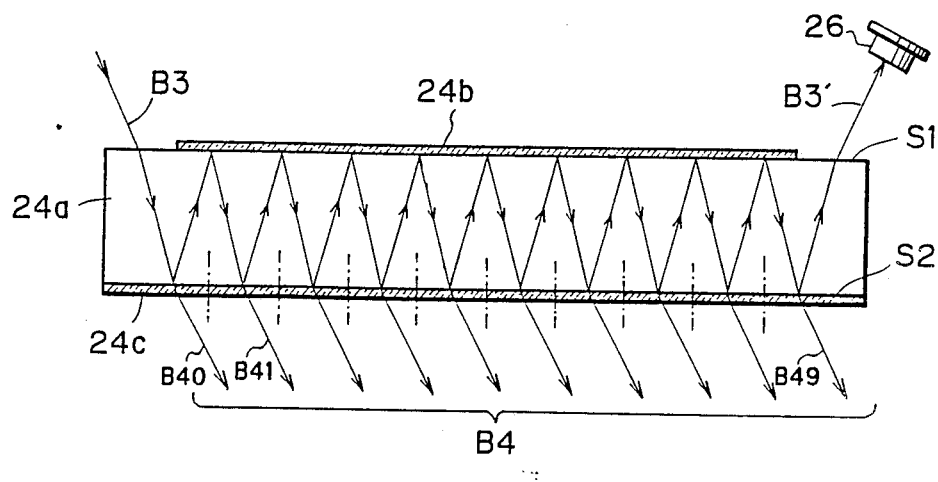
FIG. 4 is a sectional view showing the structure of a beam splitter.

FIG. 4 is a sectional view showing the structure of the beam splitter 24. As shown in FIG. 4, the beam splitter 24 is formed by a glass plate 24a having a pair of parallel flat surfaces S1, S2, a total reflection film 24b, such as an aluminum thin film, adhered to the surface S1 of the glass plate 24a and a semitransparent film 24c, such as a magnesium fluoride thin film and a gold thin film, adhered to the surface S2 of the glass plate 24a.

The surface S1 of the glass plate 24a has portions not covered with the total reflection film 24b and one of these portions is disposed so as to face the polarizing plate 22. The surface S2 of the glass plate 24a is fully covered with the semitransparent film 24c whose transmittance of light is stepwisely increased from an incident side (left-hand side in FIG. 4) while the reflectivity of light is stepwisely decreased. Thus, a polarized beam B3 which enters the glass plate 24a slightly inclined is internally reflected between the total reflection film 24b and the semitransparent film 24c, while laser beams B40, B41, ..., B49 pass through the semitransparent film 24c at regular intervals. That is, the beam splitter 24 divides the polarized beam B3 into a multibeam B4 consisting of ten parallel laser beams B40, B41, ..., B49 which travel toward an acoustic optical modulator system 30.

The respective beams B40, B41, ..., B49 of the multibeam B4 are substantially equal in light intensity to each other when a beam having a plane of polarization which is perpendicular to the plane of the figure enter the beam splitter 24, while the respective beams are not equal in light intensity to each other when a beam having a plane of polarization which is different from the same plane of polarization enters the beam splitter 24. Thus, in the case where the laser beam B2 from the collimator lens 20 is directly incident upon such a beam splitter 24, the following undesirable effect takes place:

Since the optical fiber cable 14 is bent such that it follows the movement of the recording head part 4, the plane of polarization of the laser beam B1 from the optical fiber cable 14 is displaced to follow such movement of the recording head part 4. Thus, if the laser beam B2 is directly incident upon the beam splitter 24, the respective beams B40, B41 ..., B49 of the multibeam B4 will vary in light intensity relative to each other due to movement of the recording head part 4.

According to the preferred embodiment, therefore, the polarizing plate 22 is interposed between the collimator lens 20 and the beam splitter 24 to regularize the plane of polarization of the beam incident upon the beam splitter 24, so that the beam B3 entering the beam splitter 24 has the above prescribed plane of polarization, whereby the light intensities of the respective beams B40, B41, ..., B49 of the multibeam B4 are equal to each other. Further, the following is employed in order to regularize light the intensity of the polarized beam B3 passed through the polarizing plate 22:

As shown in FIG. 4, part of the polarized beam B3 is extracted from the beam splitter 24, to detect the light intensity of the extracted beam B3' by an optical sensor 26. A signal from the optical sensor 26 is supplied to a feedback control circuit 28. The feedback control circuit 28 calculates a difference between the output signal level and a predetermined signal level and automatically varies the tube current supplied to the Ar laser tube 8 on the basis of the difference, to thereby control the light intensity of the polarized beam B3 so as to hold a constant value.

Therefore, the multibeam B4 consisting of the ten beams B40, B41, ..., B49 which have regularly uniform light intensity are generated from the beam splitter 24, to be incident upon the acoustic optical modulator system 30.

The acoustic optical modulator system 30 is provided with a plurality of optical modulation elements (not shown) in correspondence to the respective beams B40, B41, ..., B49 of the multibeam B4 to on-off control the respective laser beams B40, B41, ..., B49 of the multibeam B4 in response to image signals being inputted into the recording head part 4. The structure, operation etc. of the acoustic optical modulator system 30 are well known to those skilled in the art, and the description thereof is omitted.

A multibeam B5 consisting of ten laser beams modulated by the respective optical modulation elements of the acoustic optical modulator system 30 are reflected by reflecting mirrors 32 and 34, and then impinge upon a beam compressor 38 through a slit 36. The beam compressor 38 is formed by a zoom lens and a convex lens, and is capable of continuously adjusting beam-to beam pitches of the multibeam B5 by displacing the principal point of the zoom lens. Therefore, the beam-to-beam pitches of the multibeam B5 are adjusted by the beam compressor 38, and then guided to an image formation lens 40. The structure, operation etc. of the beam compressor 38 are well known to those skilled in the art, and the description thereof is therefore omitted.

The multibeam B6, whose beam-to-beam pitches are thus adjusted, is focused by the image formation lens 40 impinges on the photosensitive material F which is wound on a rotating cylinder 2, to thereby record a desired image.

According to the present invention, as hereinabove described, the laser beam B1 does not have a speckle pattern since optical fiber cable 14 is single mode optical fiber. Further, even if the optical fiber cable 14 is bent following the movement of the recording head part 4, the respective beams of the multibeam B5 are not varied in the amount of light. Therefore, high picture quality can be obtained.

Further, since the laser beam which is emitted from the light source part 6 provided in the exterior of the recording head part 4 is guided to the recording head part 4 through the one optical fiber cable 14, the optical transmission path connecting the light source part 6 with the recording head part 4 is simplified in structure, while the number of elements can be decreased to reduce the size of the image recorder. Further, the complexity in adjustment of the optical system is reduced.

B. Second Embodiment

The tube current supplied to the Ar laser tube 8 is controlled on the basis of the signal outputted from the optical sensor 26 in order to regularize the light intensity of the polarized beam B3 in the aforementioned preferred embodiment. Alternatively, a pair of polarizing plates may be provided on the incident or outgoing side of the optical fiber cable 14 to regularize light intensity of the polarized beam B3 by controlling the overlapping angle of these polarizing plates on the basis of the output signal from the optical sensor 26.

Figure 5:
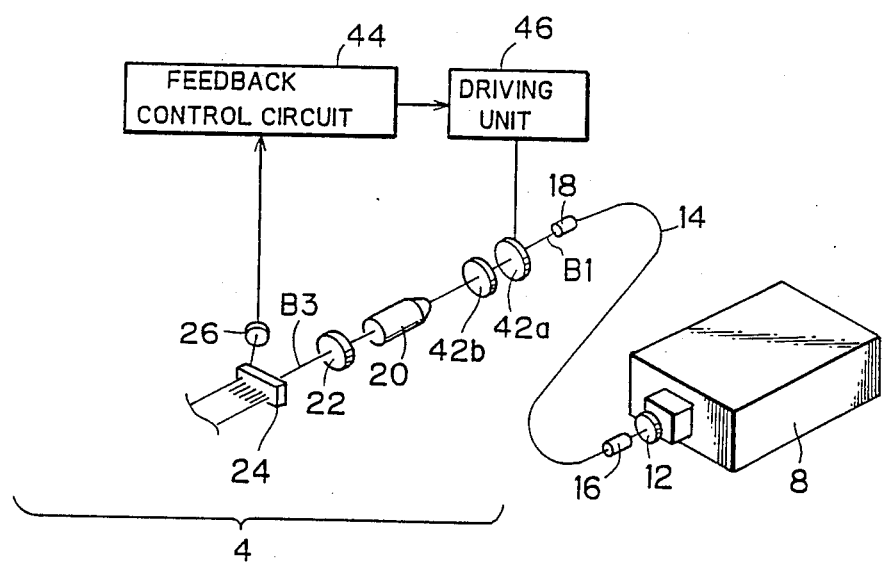
FIGS. 5 to 7 are perspective views showing essential parts of image recorders according to second to fourth embodiments of the present invention.

FIG. 5 is a perspective view showing an essential part of an image recorder according to a second embodiment. As shown in the figure, a laser beam outgoing from an Ar laser tube 8 is transmitted through a single mode optical fiber cable 14 to a recording head part 4. Further, a pair of polarizing plates 42a, 42b are interposed between an outgoing end 18 of an optical fiber cable 14 and a collimator lens 20, so that a laser beam B1 emitted from the outgoing end 18 proceeds through the polarizing plates 42a, 42b, the collimator lens 20 and a polarizing plate 22 and impinges upon a beam splitter 24. Similarly to the first embodiment, a laser beam B3 incident upon the beam splitter 24 is divided into ten parallel laser beams while a part of the laser beam B3 is extracted and incident upon an optical sensor 26. Therefore, a signal outputted from the optical sensor 26 is supplied to a feedback control 44. The feedback control circuit 44 calculates a difference between the output signal level and a predetermined signal level to give a driving unit coupled to the polarizing plate 42a a signal corresponding to the difference. The driving unit rotates the polarizing plate 42a so that an angle between the polarizing plates 42a, 42b is changed in accordance with the difference. Therefore, a multibeam B4 consisting of the ten beams which have regularly uniform light intensity is generated from the beam splitter 24.

C. Third Embodiment

Figure 6:
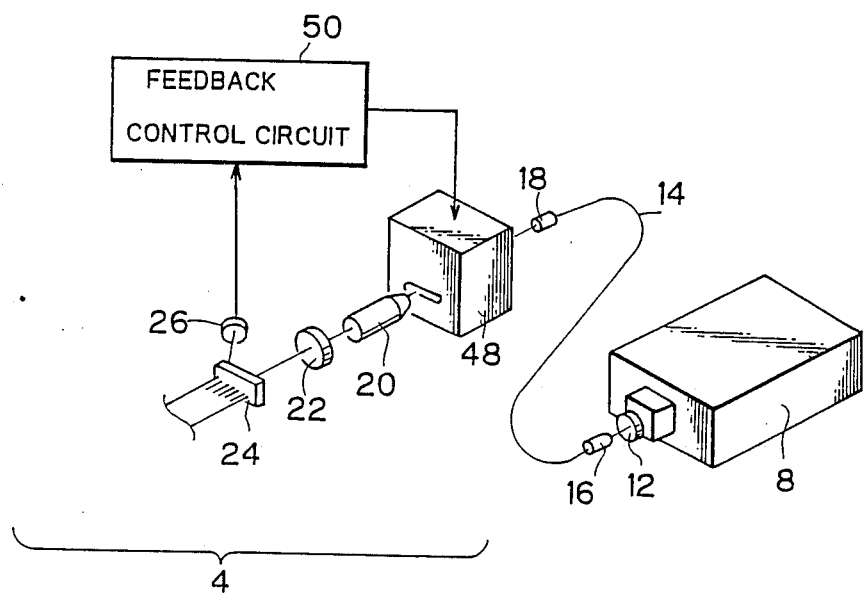

As well known, an acoustic optical modulator can control an amount of outgoing light by varying a control voltage under a constant frequency. Thus, as shown in FIG. 6, the acoustic optical modulator 48 may be disposed between an outgoing end 18 of a single mode optical fiber cable 14 and a collimator lens 20, while being supplied with a control voltage through a driving circuit (not shown) on the basis of the signal outputted from an optical sensor 26, to thereby control the amount of the laser beam incident upon the beam splitter 24. That is, a feedback control circuit 50 calculates a difference between the output signal level and a predetermined signal level and automatically varies the control voltage in accordance with the difference.

Although the acoustic optical modulator 48 are provided between the outgoing end 18 and the collimator lens 20, an acoustic optical modulator may be inserted in a light path of the laser beam. An electric optical modulator can be employed instead of the acoustic optical modulator. Further, such a feedback control circuit can be provided in either the interior or exterior of the recording head part.

D. Fourth Embodiment

Figure 7:
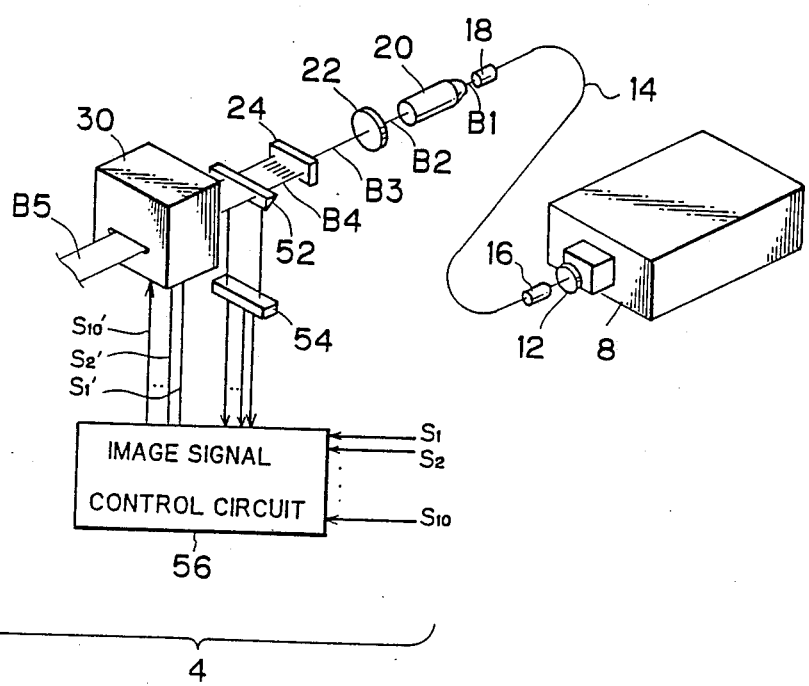

Since the optical modulation elements of an acoustic optical modulator system 30 have the above characteristic, the respective beams of a multibeam B5 may be equalized by varying the control voltages to be supplied to the respective optical modulation elements. As shown in FIG. 7, for example, a half mirror 52 may be interposed between a beam splitter 24 and the acoustic optical modulator system 30 and an optical sensor group 54 comprising a plurality of optical sensors may be provided corresponding to the half mirror 52 in order to detect a light intensity of laser beams extracted by the half mirror, whereby image signals $S_1, S_2, \ldots S_{10}$ may be corrected on the basis of signals outputted from the optical sensor group 54 by an image signal control circuit 56, while correction signals $S_1', S_2', \ldots, S_{10}'$ may be supplied to the optical modulation elements of the acoustic optical modulator system 30, respectively.

E. Others

According to the present invention, the following modifications are also available:

(1) Although an Ar laser tube 8 is employed as a light source which is provided in the exterior of an recording head part 4 in the aforementioned preferred embodiment, the present invention is not necessarily restricted to the Ar laser tube, but is also applicable to various types of laser oscillators such as a copper steam laser oscillator.

(2) Although part of the polarized beam B3 is extracted from the beam splitter 24 to detect its light intensity part 4 in the aforementioned preferred embodiment, this part of the polarized beam B3 outgoing from the polarizing plate 22 may be extracted by a half mirror provided between the polarizing plate 22 and the beam splitter 24, to detect its light intensity.

(3) Although the optical sensor 26 detects the light intensity of the extracted beam B3', an optical sensor detecting a light intensity of part of multibeam B4 may be provided. This is, the feedback control circuit 28 may control the laser power source 10 on the basis of a signal outputted from the above-indicated optical sensor.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. An apparatus for recording an image on a recording surface, comprising:
   a light source for generating a laser beam;
   a single mode optical fiber cable for transmitting the laser beam outgoing from said light source, said single mode optical fiber being flexibly bent;
   a recording head comprising first polarizing means provided on an outgoing end of said single mode optical fiber for converting the laser beam into a polarized laser beam having a prescribed polarization plane;
   dividing means for dividing said polarized laser beam into a plurality of laser beams;
   a first optical modulator for modulating the plurality of laser beams individually in response to image signals representing said image;
   optical means for directing the laser beams modulated by said first optical modulator toward the recording surface; and
   driving means for moving said recording head in a direction parallel to said recording surface.

2. An apparatus of claim 1 wherein
said dividing means includes a beam splitter comprising:
   a transparent body member having first and second surfaces being in parallel to each other,
   a total reflection film fixed on a first part of said first surface, the laser beam entering said transparent body member through a second part of said first surface, and
   a semitransparent film fixed on said second surface, said laser beam propagating an internal space of said transparent body member while being reflected by said total reflection film and said semitransparent film alternately, respective parts of the laser beam outgoing from said beam splitter at respective points where the laser beam is partially reflected by said semitransparent film so that the laser beam is divided into said plurality of laser beams.

3. An apparatus for recording an image on a recording surface, comprising:
   a light source for generating a laser beam;
   a single mode optical fiber cable for transmitting the laser beam outgoing from said light source;
   first polarizing means provided on an outgoing end of said signal mode optical fiber for converting the laser beam into a polarized laser beam having a prescribed polarization plane;
   dividing means for dividing said polarized laser beam into a plurality of laser beams;
   a first optical modulator for modulating the plurality of laser beams individually in response to image signals representing said image;
   optical means for directing the laser beams modulated by said first optical modulator toward the recording surface;
   detecting means for detecting a light intensity of the laser beam transmitted through said first polarizing means to generate a detection signal;
   intensity fixing means for fixing said intensity of the laser beam so that said detection signal is fixed at a predetermined signal level; and
   said dividing means including a beam splitter comprising:
   a transparent body member having first and second surfaces which are parallel to each other;
   a total reflection film fixed on a first part of said first surface, the laser beam entering said transparent body member through a second part of said first surface; and
   a semitransparent film fixed on said second surface, said laser beam propagating an internal space of said transparent body member while being reflected by said total reflection film and said semitransparent film alternately, respective parts of the laser beam outgoing from said beam splitter at respective points where the laser beam is partially reflected by said semitransparent film so that the laser beam is divided into said plurality of laser beams.

4. An apparatus of claim 3 wherein
said intensity fixing means includes:
means for obtaining a difference between said detection signal and said predetermined signal level, and
means for varying an electric power supplied to said light source in accordance with said difference.

5. An apparatus of claim 3 wherein
said intensity fixing means includes:
a pair of second polarizing means inserted in a light path of the laser beam,
means for obtaining a difference between said detection signal and said predetermined signal level, and
means coupled to at least one of said pair of second polarizing means for relatively rotating said pair of second polarizing means in accordance with said difference so that an angle between respective polarizing planes of said pair of second polarizing means is changed in accordance with said difference.

6. An apparatus of claim 3 wherein
said intensity fixing means includes:
a second optical modulator inserted in a light path of the laser beam for controlling an amount of light thereof the laser beam in accordance with a given signal,
means for generating a difference signal representing a difference between said detection signal and said predetermined signal level, and
means for transmitting said difference signal to said second optical modulator as said given signal.

7. An apparatus of claim 3 wherein
said detecting means includes a photosensor for detecting a part of the laser beam which outgoes from a third part of said first suface, said first part being located between said second and third parts.

8. An apparatus of claim 3 further comprising:

means for detecting respective intensities of said plurality of laser beams to generate a plurality of detection signals, means for generating a plurality of correction signals representing respective differences between said plurality of detection signals and a predetermined value, and means for transmitting said plurality of correction signals to said first optical modulator in order to correct respective modulation factors for said plurality of laser beams.

* * * * *